Aug. 15, 1967      L. P. SEXTON      3,335,718
FITTED MULTIPLE INTERDENTAL STIMULATOR
AND METHOD OF MAKING SAME
Filed Oct. 12, 1964
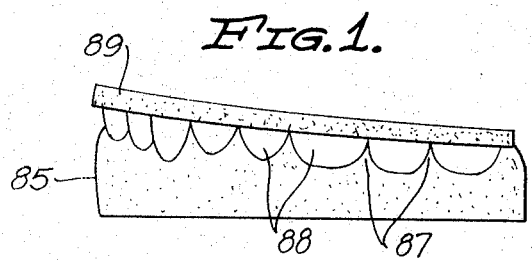
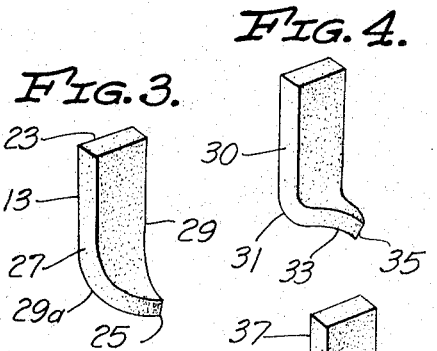
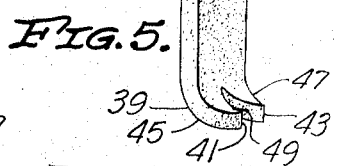
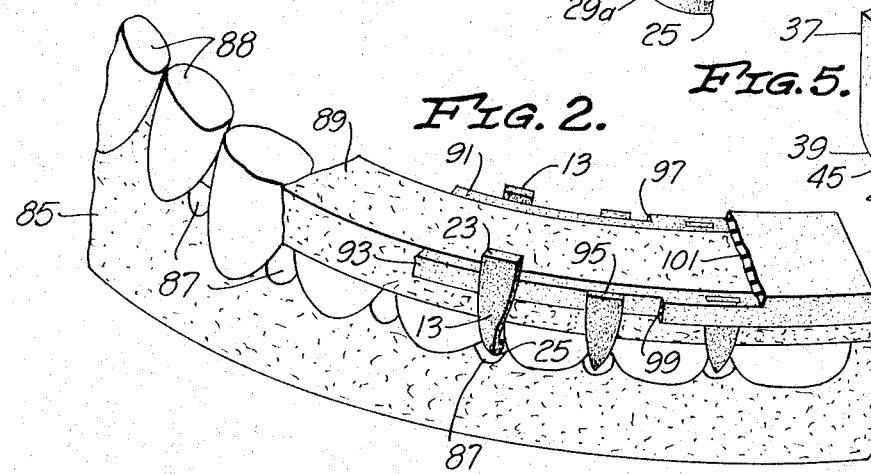
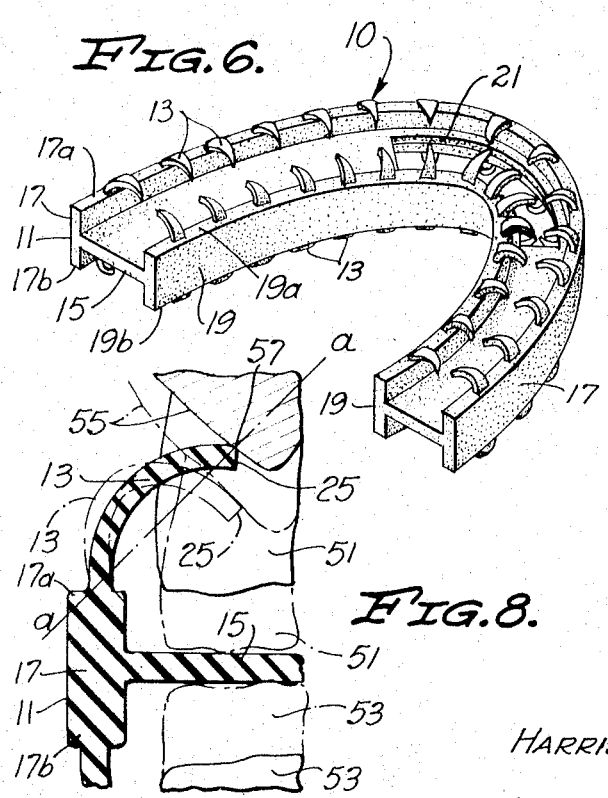
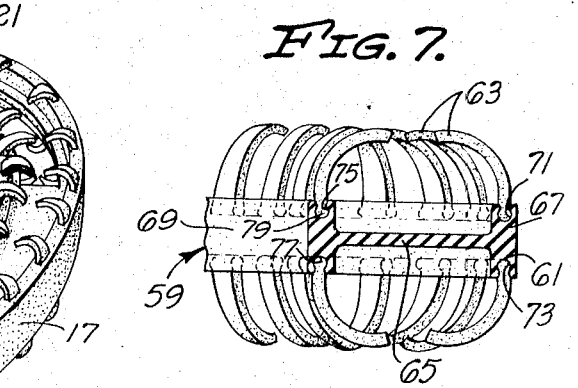
INVENTOR
LOUIS P. SEXTON
BY HIS ATTORNEYS
HARRIS, KIECH, RUSSELL & KERN

United States Patent Office 3,335,718
Patented Aug. 15, 1967

3,335,718
FITTED MULTIPLE INTERDENTAL STIMULATOR
AND METHOD OF MAKING SAME
Louis P. Sexton, Rte. 1, Box 77,
Buttonwillow, Calif. 93206
Filed Oct. 12, 1964, Ser. No. 403,178
13 Claims. (Cl. 128—62)

ABSTRACT OF THE DISCLOSURE

An interdental gum stimulator adapted to fit over an upper or lower set of human teeth in the mouth of a user, conforming generally to the curvature of such set of teeth, and having a plurality of flexible tips secured thereto, each of such tips being adapted to extend between adjoining teeth to stimulate the gums in the neighborhood thereof.

*Disclosure*

Pyorrhea is a term used to designate a group of frequently occurring diseases which attack the gums and bone around the teeth. Nearly all elderly people have it to some degree. To avoid pyorrhea or to maintain gum health after medical treatment for pyorrhea, the gums between adjacent teeth must be stimulated at least once a day. Proper stimulation should squeeze blood out of the gums between adjacent teeth by application of a small force thereto. Then the force should be removed to allow the blood to flow back into that area. Ten to twenty repetitions of this cycle are usually required daily.

Prior art devices for gum stimulation usually include a handle carrying a plate having a plurality of lateral, generally straight projections protruding therefrom. The user holds the plate and projections in his mouth with the handle and chews to allow the projections to engage his gums and stimulate them. These prior art stimulators were very time consuming as they are not sufficiently wide and do not have enough projections to engage the gum area between all adjacent teeth simultaneously. The spacing between adjacent projections in these stimulators is not designed to accommodate the mouth of a specific user, and, accordingly, some of the gum areas are not properly massaged. Furthermore, in the prior art stimulators, the projections were generally straight and did not provide adequate and proper stimulation.

Accordingly, it is an object of this invention to provide a fitted multiple interdental stimulator in which the tips or projections are properly spaced to engage the gum surface between adjacent teeth of a specific user. In one form of the device, the spacing between tips may be manually adjusted by the user. In another form of the device, the stimulator is custom made to fit the mouth and gum surfaces of a particular user.

Another object of this invention is to provide a stimulator in which flexible tips extend outwardly from a base and then curve toward the appropriate gum area to engage and massage same. The curved flexible tips provide superior massaging action by rolling against the gums of the user as he chews on the stimulator. The curved flexible tips also control the pressure applied against the gums, thereby eliminating the need for the user to employ judgment in deciding what pressure is appropriate.

A further object of this invention is to provide a gum stimulator in which the gum area between all of the teeth in the mouth is simultaneously engaged by the tips of the stimulator for simultaneous stimulation. Thus, the stimulator of the present invention saves considerable time and eliminates the need for manual manipulation of the stimulator.

Still another object of this invention is to provide a stimulator which requires no handle and in which stimulation is provided by chewing on the stimulator.

A further object of this invention is to provide a method of making an interdental stimulator which is adapted to fit the mouth and gum contour of a particular user.

According to one aspect of the invention, a curved flexible base having two flanges connected by a web, with the web being adapted to be positioned between the upper and lower teeth of the user, is tailor made for a specific user. A plurality of flexible tips is rigidly secured to the upper and lower surfaces of each of the flanges. In tailor making this device, the tips are spaced apart at varying distances to correspond to the varying tooth widths of the particular user so that the tips can engage the gum surface between adjacent teeth. The tips extend away from the flange members and curve inwardly toward the gum surfaces between adjacent teeth. The tips are curved to provide a preferred type of rolling stimulation and to control the pressure which is applied against the gum surface. According to another embodiment of the invention, the upper and lower surfaces of each of the flanges are provided with elongated grooves and each of the tips has a cooperating tongue member. The tongues are slidably positioned in the elongated groove so that the spacing between the tips may be adjusted to accommodate a specific user.

Another aspect of this invention is a method of making a fitted multiple interdental stimulator. The method includes making a mouth model or a mouth mold, widening the spaces between adjacent teeth of the mold or model, depositing on the mold or model a layer of hardenable material, depositing a bead of semi-liquid material which is settable to form a soft flexible strip on the side of said mold or model, positioning a flexible tip between adjacent teeth of the mold or model, and securing the tip to the bead.

Further objects and advantages will appear in the course of the following description.

In the drawing:

FIG. 1 is a side elevation of a mouth model having a strip of plaster of Paris disposed along its top;

FIG. 2 is a fragmentary perspective view illustrating the steps required to make the interdental stimulator of the present invention;

FIGS. 3 through 5 are perspective views showing three different forms of tip design.

FIG. 6 is a perspective view of one embodiment of the fitted multiple interdental stimulator of this invention;

FIG. 7 is another embodiment of a fitted multiple interdental stimulator; and

FIG. 8 is a fragmentary sectional view of the fitted multiple interdental stimulator in use.

A tailor made interdental stimulator 10 shown in FIG. 6 comprises a base 11 and a plurality of tips 13 which are preferably integral with the base. Both the base 11 and the tips 13 are preferably constructed of a flexible soft material such as rubber. The stimulator shown in FIG. 6 is preferably tailor made to fit the mouth structure of a particular user.

In the specific embodiment shown, the base 11 has the shape of an I-beam and includes a web 15 which connects an outer flange 17 with an inner flange 19. The flange 17 has an upper end 17a and a lower end 17b, and the flange 19 has an upper end 19a and a lower end 19b. All edges of the base 11 are preferably rounded to more comfortably engage the mouth of the user. The web 15 is curved to conform to the shape of the upper and lower rows of teeth of the particular user and is adapted to be positioned between such upper and lower rows of teeth. The web 15 is also provided with an arcuate opening 21 in the front end thereof. The flanges 17 and 19 are preferably formed at approximately right angles to the web 15 and extend for a short distance above and below the web. In use, the outer flange 17 is disposed between the outer surface of the rows of teeth and the inner surface of the mouth, and the inner flange 19 is positioned behind, but adjacent to, the rows of teeth. Although use of the flanges 17 and 19 is preferred, the curved tips 13 could be directly attached to an appropriately shaped web and in this case the flanges could be eliminated.

The tips 13 are rigidly secured to and project from the upper and lower ends 17a, 17b, 19a and 19b of the flanges 17 and 19. In tailor making this stimulator, the tips 13 have been spaced so that the ends thereof will properly engage the gum surface between adjacent teeth of a specific user. As the teeth of a given user typically vary in size, the spacing between the adjacent tips 13 will correspondingly vary. The stimulator is preferably provided with sixty tips appropriately arranged so that all of the gum surface between adjacent teeth may be simultaneously stimulated to thereby save considerable time for the user.

Any one or a combination of tip forms shown in FIGS. 3 through 5 may be utilized. FIG. 3 shows the tip 13 as comprising a broad portion 23 which is secured to the flange 17 or 19 and a point 25 which is adapted to engage the gum surface between adjacent teeth. The tip 13 has a pair of sides 27 and 29 which are generally parallel adjacent the broad portion 23, but then taper to form a point 25. The tip 13 forms a generally rectangular solid adjacent the broad portion 23, but then curves smoothly through an arc of approximately 90° to form a curved portion 29a and the point 25. Thus, with the broad portion 23 of the tip 13 suitably secured to and projecting from the upper surface 17a of the flange 17, the tip will extend upwardly for a portion of its length and then curve smoothly through an arc of approximately 90° until the point 25 has suitably engaged the gum between adjacent teeth.

FIG. 4 illustrates an alternate tip 30. The tip 30 is the same as that shown in FIG. 3 except that it has a curved portion 31 which curves more abruptly than the gently curved portion 29a and this tip is also provided with a small reverse bend 33. The tip 30 has a point 35 which, because of the reverse bend 33, will engage the gum surface at a slightly different angle than the point 25. The tip 30 is attached to the base 11 in the same manner as the tip 13.

The tip 13 is the preferred form; however, the tips 30 and 37 are particularly advantageous in accommodating unusual tooth structure. For example, the tip 30 may be used where a tooth or group of teeth projects at an unusual angle. Where the teeth are small and overlap and there is insufficient space for the tip 13, the tip 37 with the forked end portion may be used.

FIG. 5 illustrates a tip 37 having a forked end portion. The tip 37 has a smooth curve 39 and a pair of points 41 and 43. The points 41 and 43 are formed by a pair of tapering sides 45 and 47 respectively and a generally V-shaped groove 49 which is cut between the points. Because the tip 37 is provided with two points 41 and 43, it can take the place of either two tips 13 or two tips 30. Thus, the tip shown in FIG. 5 with the forked end portion can be used to reduce the total number of tips required. The tip 37 may be attached to the base 11 in the same manner as the tip 13.

In the specific embodiment illustrated in FIG. 6, the tips 13 extend from the upper ends 17a and 19a and from the lower ends 17b and 19b and are integral with the I-beam shaped base 11. It should be understood that the stimulator may be provided in two parts by severing or removing the web 15 to provide separate inner and outer stimulators. Likewise, the device may be provided as a separate upper stimulator and a separate lower stimulator. In this instance, the base 11 could take the form of two channel-shaped members just as though the web 15 had been severed in a horizontal plane through its longitudinal axis. The separate stimulators are often desired as they are easier to insert.

When the tips 13 or 30 are used, sixty of them are preferably provided so that all of the gum area between adjacent teeth may be simultaneously stimulated. When the tip 37 having the two points 41 and 43 is employed, usually in combination with other single pointed tips 13 or 30, a smaller number of tips may be provided.

The manner of operation may best be understood by reference to FIG. 8. The stimulator is inserted into the mouth with the web 15 between a row of teeth 51 and another row of teeth 53. When the device is in the unstressed position, the teeth are slightly separated and are positioned at some small distance away from the web 15. In this point, the point 25 contacts a gum surface 55 at a point 57. Also in this position, a straight line $a-a$ drawn from the point 57 through the center of the plane formed by the intersection of the tip 13 with the flange 17 should form an angle of approximately 45° with the horizontal. This is required so that the tip 13 will roll rather than slide as the user bites down on the device as shown in the dashed lines in FIG. 8. Thus, as the user bites on the device, the force on the gum 55 increases, but the area of contact between the gum 55 and the tip 13 experiences a corresponding increase, thereby controlling the stimulation pressure and keeping the stress in pounds per square inch against the gum from reaching harmful proportions. This force squeezes blood from this gum area. The rows of teeth are then moved apart to allow the tips to return to the unstressed condition and the blood to flow back to this gum area. The device is held in position by the contact of the ends of the tips with the gums. By repeating this chewing process ten or twenty times daily the gums receive excellent stimulation.

FIG. 7 shows another embodiment of the interdental stimulator. FIG. 7 illustrates a stimulator 59 including a base 61, which may or may not be tailor made for a specific user, and a plurality of tips 63. The soft stimulator 59 is constructed entirely of flexible soft material such as rubber. The base 61 is curved to conform generally to the curve of the mouth and includes a web 65 and a pair of flanges 67 and 69. Elongated grooves 71, 73, 75, and 77 are formed in the upper and lower surfaces of the flanges 67 and 69 respectively. Each of the grooves has an enlarged interior portion and a relatively narrow neck portion.

The tips 63 may be any of the types shown in FIGS. 3 through 5; however, the base of the tip is formed with a tongue 79 which is adapted to be inserted in one of the grooves 71, 73, 75, and 77. The tongue 79 is slidably received by one of the grooves so that the spacing between adjacent tips may be varied. Thus, the user may vary the spacing between adjacent tips so that the stimulator 63 will suitably accommodate his tooth size and spacing. It can readily be seen that the stimulator of FIG. 7 is very flexible in that it can be adapted for use by any number of patients. The stimulator of FIG. 7 is used in the same manner as that shown in FIG. 6.

As mentioned previously, the embodiment shown in FIG. 6 is tailor made to fit the mouth of a particular user. FIGS. 1 and 2 illustrate the steps used to manufacture the stimulator shown in FIG. 6. First a mouth model 85 having a plurality of spaces 87 between adjacent lower teeth 88 is constructed according to conventional practice. It should be understood that a mouth mold, also constructed in accordance with conventional practice, may be employed in lieu of a mouth model. The word "design" is used herein to refer to mouth molds, mouth models, or other means for obtaining the shape and size of the teeth and mouth structure of a patient. Next, the spaces 87 between adjacent teeth are widened by an appropriate tool. Then a strip 89 of hardenable material, preferably plaster of Paris, is laid over the top of the model 85. A pair of beads 91 and 93 of semi-liquid material is deposited on opposite sides of the strip 89. The beads are preferably rubber. When the rubber beads 91 and 93 become tacky, the tips 13 are positioned with their points 25 in the widened spaces 87 and with their broad portions 23 in the tacky beads 91 and 93. The beads 91 and 93 harden to secure the tips 13 thereto. After the beads 91 and 93 have hardened, the broad portions 23 of the tips 13 are trimmed to be substantially flush with the beads as shown at 95 in FIG. 2. Then additional strips of rubber 97 and 99 in a semi-liquid state are laid over the beads 91 and 93 respectively to cover the sides of the tips 13 and another layer of rubber 101 is deposited along the strip 89 to connect the beads 91 and 93 and the strips 97 and 99 and to form a portion of the web 15. Alternatively, a single layer of rubber may be used to replace the layers 97, 99, and 101. A similar process may be followed for making a stimulator for the upper gums. If desired, the rubber strip 101 of the bottom gum stimulator and the corresponding rubber strip of the top gum stimulator may be cemented together to form the web 15 and a stimulator as shown in FIG. 6. Of course, the plaster of Paris strips 89 must be removed to produce the finished product.

Thus, the spacing between adjacent tips is controlled to accommodate a specific user either through custom tailoring or through the provision of means to adjust the spacing between the tips. The tips of the present invention are curved and pointed to control the pressure applied to the gums and to eliminate the need for the user to make this pressure determination. Further, with the sixty-tip stimulator considerable time may be saved as the entire appropriate gum area may be stimulated simultaneously.

Although exemplary embodiments of the invention have been disclosed, it will be understood that other applications of the invention are possible and that the embodiments disclosed may be subjected to various changes, modifications, and substitutions without necessarily departing from the spirit of the invention.

What is claimed is:
1. A multiple interdental stimulator comprising:
a flexible base curve to conform to the interior of the mouth of a user;
a plurality of spaced flexible tips extending outwardly from and secured to said base, said tips being adapted to engage the gums between adjacent teeth to stimulate the gums; and
means for varying the spaces between said tips so that the tips can be made to properly engage the gum surface between adjacent teeth.

2. The stimulator of claim 1 wherein said means includes an elongated groove in said base and a cooperating tongue on each of said tips, said tongues being slidably positioned in said elongated groove.

3. The stimulator of claim 1 wherein some of said flexible tips extend upwardly from said base to engage the gums between adjacent upper teeth and others of said tips extend downwardly to engage the gums between adjacent lower teeth.

4. The stimulator of claim 1 wherein said base conforms generally to an I-beam having two flanges connected by a web, the web being adapted to be positioned between the upper and lower teeth, some of said tips being secured to the upper ends of said flanges to engage the gums between adjacent upper teeth and others of said tips being secured to the lower ends of said flanges to engage the gums between adjacent lower teeth.

5. A multiple interdental stimulator comprising:
a flexible base curved to conform to the arcuate line defined by the rows of teeth of the user and adapted to be spaced from the outer and inner surfaces of said teeth and the gums to permit movement of the jaws of the user without contact between said base and the outer and inner surfaces of the teeth and the gums; and
a plurality of spaced flexible tips secured to and extending outwardly from said base and adapted for curving toward the gums, said tips being spaced different distances apart so that they may engage the gums between adjacent teeth whereby chewing on said stimulator causes said curved tips to roll on the gum surfaces to stimulate same, said tips being provided in sufficient number so that the tips may engage the gum surfaces between all of the adjacent teeth in a row of teeth, and the engagement of said tips with the gums positioning said stimulator in the mouth of the user.

6. The stimulator of claim 5 wherein said tips have broad portions where they are secured to said base, each of said broad portions tapering to a pointed end, said pointed end being adapted to engage the gum surface.

7. The stimulator of claim 5 wherein some of said tips taper toward a single point as they curve toward the gums and other of said tips have forked end portions for engaging the gum surface between overlapping teeth.

8. The stimulator of claim 5 wherein at least some of said tips have forked end portions, each tip providing two points for engaging the gum surface.

9. A multiple interdental stimulator comprising:
a curved flexible base having two flanges connected by a web, said web being adapted to be positioned between the upper and lower teeth of a user, one of said flanges being spaced from and parallel to the outer surface of said teeth and the other of said flanges being spaced from and parallel to the inner surface of said teeth to permit movement of the jaws of the user without contact between said flanges and the outer and inner surfaces of the teeth and the gums, said base being curved to conform to the arcuate line defined by the rows of said teeth; and
a plurality of flexible tips secured to the upper and lower surfaces of each of said flanges, said tips being spaced apart at varying distances to correspond to the varying tooth widths so that said tips can engage the gum surface between adjacent teeth, said tips on said upper surface of said flanges extending upwardly and curving inwardly for engaging the gum surface between adjacent upper teeth, said tips on said lower surface of said flanges extending downwardly and curving inwardly for engaging the gum surface between adjacent lower teeth, whereby chewing on said stimulator causes said curved tips to roll on the gum surfaces to stimulate same.

10. A method of making a fitted multiple interdental stimulator comprising:
providing a design of a row of teeth;
depositing a layer of hardenable spacer material on a side of said design;
depositing a bead of semi-liquid material which is settable to form a soft flexible strip on the side of said hardenable material and spaced from said design;
positioning a flexible tip between adjacent teeth of said design; and
securing said tip to said bead.

11. The method of claim 10 further comprising depositing an additional strip of semi-liquid material around the side of said bead to cover the portion of said tip secured to said bead.

12. A method of making a fitting multiple interdental stimulator comprising:
providing a design of a row of teeth in a mouth;
widening the spaces between adjacent teeth of said design;
depositing a layer of hardenable spacer material on a side of said design;
depositing a bead of semi-liquid material which is settable to form a soft flexible strip on the side of said hardenable material and spaced from said design;
positioning flexible tips between adjacent teeth of said design; and
securing said tips to said bead.

13. A method of making a fitted multiple interdental stimulator comprising:

providing a flexible base curved to conform to the interior of the mouth of a user; and slidably mounting on said base a plurality of flexible tips which may be positionally adjusted at different distances apart so that they may engage the gums between adjacent teeth of a specific user.

References Cited

UNITED STATES PATENTS

| | | | |
|---|---|---|---|
| 1,736,996 | 11/1929 | Dalmas. | |
| 1,818,146 | 8/1931 | Maker | 128—62 |
| 2,249,721 | 7/1941 | Morris | 128—62 |
| 2,284,200 | 5/1942 | Gruss | 128—62 |
| 3,033,197 | 5/1962 | Barckley | 128—62 |

FOREIGN PATENTS 812,339 8/1951 Germany.

RICHARD A. GAUDET, *Primary Examiner.*

L. W. TRAPP, *Examiner.*